US012650361B2

(12) United States Patent
Wu et al.

(10) Patent No.: US 12,650,361 B2
(45) Date of Patent: Jun. 9, 2026

(54) DECOUPLING MECHANISM AND TESTING APPARATUS FOR LARGE-DISPLACEMENT VIBRATION TESTS

(71) Applicant: SUZHOU SUSHI TESTING GROUP CO., LTD., Suzhou (CN)

(72) Inventors: Yugang Wu, Suzhou (CN); Jiangfeng Zhu, Suzhou (CN); Bin Zhao, Suzhou (CN)

(73) Assignee: SUZHOU SUSHI TESTING GROUP CO., LTD., Suzhou (CN)

( * ) Notice: Subject to any disclaimer, the term of this patent is extended or adjusted under 35 U.S.C. 154(b) by 286 days.

(21) Appl. No.: 18/578,820

(22) PCT Filed: May 31, 2022

(86) PCT No.: PCT/CN2022/096271
§ 371 (c)(1),
(2) Date: Jan. 12, 2024

(87) PCT Pub. No.: WO2023/284433
PCT Pub. Date: Jan. 19, 2023

(65) Prior Publication Data
US 2024/0328893 A1 Oct. 3, 2024

(30) Foreign Application Priority Data
Jul. 15, 2021 (CN) .......................... 202110801589.5

(51) Int. Cl.
*G01M 7/02* (2006.01)

(52) U.S. Cl.
CPC .................................... *G01M 7/022* (2013.01)

(58) Field of Classification Search
CPC .................................................... G01M 7/022
See application file for complete search history.

(56) References Cited

U.S. PATENT DOCUMENTS 5,343,752 A * 9/1994 Woyski ................... G01M 7/06
73/668
2006/0248955 A1* 11/2006 Fukushima ............. G01M 7/06
73/664
(Continued)

FOREIGN PATENT DOCUMENTS

CN 203616126 U * 5/2014
CN 103862328 A * 6/2014 ......... B23Q 17/2452
(Continued)

OTHER PUBLICATIONS

International Search Report, issued in PCT/CN2022/096271, PCT/ISA/210, dated Aug. 2, 2022.

*Primary Examiner* — Chico A Foxx
(74) *Attorney, Agent, or Firm* — Birch, Stewart, Kolasch & Birch, LLP

(57) ABSTRACT

A decoupling mechanism (01) for large-displacement vibration tests includes a first transfer decoupling assembly (1), a rotary amplifying assembly (3) and a second transfer decoupling assembly (2), wherein the first transfer decoupling assembly (1) includes a first transfer shaft (11) and a first transfer main body (12) axially connected to the first transfer shaft (11); the second transfer decoupling assembly (2) includes a second transfer shaft (21) and a second transfer main body (22) axially connected to the second transfer shaft (21); an extension direction of the axis of the first transfer shaft (11) is the same as that of the axis of the second transfer shaft (21); a first connecting shaft (15) is arranged between the rotary amplifying assembly (3) and the first transfer main body (12), and a second connecting shaft (25) is arranged between the rotary amplifying assembly (3) and the second transfer main body (22); and extension directions of the axis of the first connecting shaft (15) and the axis of the second connecting shaft (25) are the same and are perpendicular to that of the axis of the first transfer shaft (11)

(Continued)

or the second transfer shaft (21). A vibration testing apparatus prepared by combining the decoupling mechanism (01) with a vibration exciter (02) and a sliding table assembly (03) realizes large-displacement vibration of the sliding table assembly.

13 Claims, 4 Drawing Sheets

(56) References Cited

U.S. PATENT DOCUMENTS

| | | | | | |
|---|---|---|---|---|---|
| 2018/0195932 A1 | * | 7/2018 | Xu | .................... | G01M 13/00 |
| 2021/0356353 A1 | * | 11/2021 | Lim | .................... | G10K 9/04 |

FOREIGN PATENT DOCUMENTS

| | | | | | | |
|---|---|---|---|---|---|---|
| CN | 103575490 | B | * | 11/2015 | | |
| CN | 107515127 | A | * | 12/2017 | ............ | G01M 17/08 |
| CN | 107795594 | A | * | 3/2018 | ............... | F16D 3/16 |
| CN | 207280766 | U | * | 4/2018 | | |
| CN | 109211584 | A | * | 1/2019 | .......... | G01M 17/007 |
| CN | 106289696 | B | * | 3/2019 | ............. | G01M 7/06 |
| CN | 109443679 | A | | 3/2019 | | |
| CN | 109612713 | A | * | 4/2019 | ........... | G01M 13/00 |
| CN | 208781457 | U | * | 4/2019 | | |
| CN | 210166113 | U | * | 3/2020 | | |
| CN | 210487214 | U | * | 5/2020 | | |
| CN | 210571269 | U | | 5/2020 | | |
| CN | 111604249 | A | | 9/2020 | | |
| CN | 112284708 | A | * | 1/2021 | ........... | G01M 7/025 |
| CN | 112577684 | A | | 3/2021 | | |
| CN | 113074891 | A | | 7/2021 | | |
| CN | 113310652 | A | * | 8/2021 | ........... | G01M 7/022 |
| CN | 113375885 | A | | 9/2021 | | |
| CN | 116539264 | A | * | 8/2023 | ........... | G01M 7/027 |
| CN | 117073952 | A | * | 11/2023 | ........... | G01M 7/025 |
| JP | 2013-205178 | A | | 10/2013 | | |
| JP | 2017-3406 | A | | 1/2017 | | |
| JP | 2018-115914 | A | | 7/2018 | | |
| WO | WO 2018/055075 | A1 | | 3/2018 | | |

* cited by examiner

DECOUPLING MECHANISM AND TESTING APPARATUS FOR LARGE-DISPLACEMENT VIBRATION TESTS

CROSS-REFERENCE TO RELATED APPLICATION

This application claims priority of the Chinese Patent Application No. 202110801589.5, filed on Jul. 15, 2021 and titled "DECOUPLING MECHANISM AND TESTING APPARATUS FOR LARGE-DISPLACEMENT VIBRATION TESTS", which is incorporated herein by reference in its entirety.

TECHNICAL FIELD

The present invention pertains to the technical field of vibration tests, and particularly relates to a decoupling mechanism and a testing apparatus for large-displacement vibration tests.

BACKGROUND ART

A vibration table can simulate a variety of vibration mechanics environments, and thus is widely used in simulation tests of many typical vibrations, such as automobile parts, electronic components and aerospace products.

A conventional vibration table includes a vibration exciter, a support, a connector and a horizontal sliding table. The vibration exciter and the horizontal sliding table are connected to two ends of the connector. Both the horizontal sliding table and the vibration exciter are fixed to the support. Vibration of the vibration exciter can be transferred to the horizontal sliding table by means of connection, and a test article is installed on the horizontal sliding table to vibrate together. With the development of testing technologies, the requirements for testing are getting higher and higher, and the demand for large-displacement vibration tests is becoming more and more urgent. Due to the limitations of the internal structure and guidance of the table, currently, the maximum displacement of an electrodynamic vibration table is 100 mm, and the test for displacement exceeding 100 mm cannot be carried out on the electrodynamic vibration table. This greatly limits the development and exploration of the large-displacement vibration testing technologies. A conventional electrodynamic vibration table cannot meet the requirements.

SUMMARY OF THE INVENTION

An objective of the present application is to promote the development of large-displacement vibration testing technologies to meet the requirements of large-displacement vibration tests.

To fulfill the above-mentioned objective, the present application adopts the following technical solutions:

The present application provides a decoupling mechanism for large-displacement vibration tests, wherein comprising a first transfer decoupling assembly, a rotary amplifying assembly and a second transfer decoupling assembly, wherein the first transfer decoupling assembly comprises a first transfer shaft and a first transfer main body, and the first transfer main body is axially connected to the first transfer shaft; the second transfer decoupling assembly comprises a second transfer shaft and a second transfer main body, and the second transfer main body is axially connected to the second transfer shaft; an extension direction of an axis of the first transfer shaft is the same as that of an axis of the second transfer shaft; the rotary amplifying assembly is connected to the first transfer shaft by means of the first transfer main body, and a first connecting shaft is arranged between the rotary amplifying assembly and the first transfer main body; the rotary amplifying assembly and the second transfer decoupling assembly are connected by means of the second transfer main body, and a second connecting shaft is arranged between the rotary amplifying assembly and the second transfer main body; and extension directions of an axis of the first connecting shaft and an axis of the second connecting shaft are the same and are perpendicular to that of the axis of the first transfer shaft or the second transfer shaft; the first transfer decoupling assembly is arranged on one side of a vibration exciter, and the second transfer decoupling assembly is arranged on one side of a sliding table assembly; and when in use, the first transfer decoupling assembly is fixedly connected to the vibration exciter, and the second transfer decoupling assembly is fixedly connected to the sliding table assembly.

As a further improvement of this application, the rotary amplifying assembly comprises a support and a transfer rod; the top of the support is axially connected to the transfer rod by means of a third connecting shaft; an extension direction of an axis of the third connecting shaft is the same as that of the axis of the first connecting shaft or the second connecting shaft; a first end of the transfer rod is axially connected to the first transfer main body by means of the first connecting shaft; and a second end of the transfer rod is connected to the second transfer main body by means of the second connecting shaft.

As a further improvement of this application, a horizontal straight-line distance between the axis of the third connecting shaft and the axis of the first connecting shaft is L1, and a horizontal straight-line distance between the axis of the third connecting shaft and the axis of the second connecting shaft is L2, L1<L2.

As a further improvement of this application, the third connecting shaft is arranged at the top of the support and integrally-molded with the support, and the transfer rod is provided with a third through hole running through the third connecting shaft.

As a further improvement of this application, a third boss is arranged at an end portion of the third connecting shaft in contact with the support.

As a further improvement of this application, the third connecting shaft is arranged on the transfer rod and integrally-molded with the transfer rod, and the top of the support is provided with an accommodating cavity for accommodating the third connecting shaft.

As a further improvement of this application, the first transfer decoupling assembly further comprises a first fixing block and a second fixing block, and the first fixing block and the second fixing block are axially connected to the first transfer shaft and located on two sides of the first transfer main body respectively.

As a further improvement of this application, the first fixing block is provided with a first shaft hole, and a first end of the first transfer shaft is axially connected to the first fixing block through the first shaft hole; and the second fixing block is provided with a second shaft hole, and a second end of the first transfer shaft is axially connected to the second fixing block through the second shaft hole.

As a further improvement of this application, the second transfer decoupling assembly further comprises a third fixing block and a fourth fixing block, and the third fixing block and the fourth fixing block are axially connected to the second transfer shaft and located on two sides of the second transfer main body respectively.

As a further improvement of this application, the third fixing block is provided with a third shaft hole, and a first end of the second transfer shaft is axially connected to the third fixing block through the third shaft hole; and the fourth fixing block is provided with a fourth shaft hole, and a second end of the second transfer shaft is axially connected to the fourth fixing block through the fourth shaft hole.

To fulfill the above-mentioned objective, the present application provides a vibration testing apparatus for large-displacement vibration tests, comprising a vibration exciter, a sliding table assembly and a decoupling mechanism, the decoupling mechanism is the decoupling mechanism described above.

As a further improvement of this application, the vibration exciter is provided with a first adapter block, and the sliding table assembly is provided with a second adapter block.

The present application has the beneficial effects that a decoupling mechanism for large-displacement vibration tests is provided, including a first transfer decoupling assembly, a rotary amplifying assembly and a second transfer decoupling assembly. When in use, the first transfer decoupling assembly is fixedly connected to a vibration exciter, and the second transfer decoupling assembly is fixedly connected to a sliding table assembly. Through the transfer of force, after the first transfer decoupling assembly receives an acting force from the vibration exciter, the acting force is amplified by the rotary amplifying assembly, the amplified acting force is transferred to the second transfer decoupling assembly, and the sliding table assembly receives the acting force from the second transfer decoupling assembly, thus finally realizing large-displacement vibration of the sliding table assembly.

Figure 1:
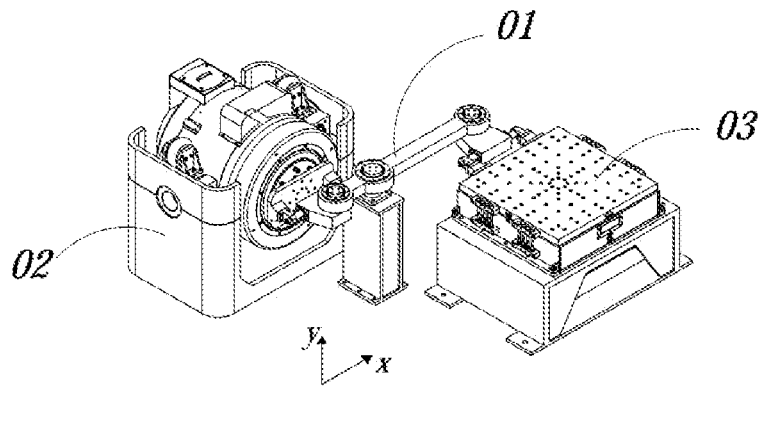
FIG. 1 is a schematic axial view of a testing apparatus for large-displacement vibration tests.

In the drawings: 01—decoupling apparatus; 02—vibration exciter; 03—sliding table assembly; 1—first transfer decoupling assembly; 2—second transfer decoupling assembly; 3—rotary amplifying assembly, 11—first transfer shaft; 12—first transfer main body; 13—first fixing block; 14—second fixing block; 15—first connecting shaft; 21—second transfer shaft; 22—second transfer main body; 23—third fixing block; 24—fourth fixing block; 25—second connecting shaft; 31—support; 32—transfer rod; 33—third connecting shaft; 4—first adapter block; 5—second adapter block.

DETAILED DESCRIPTION

The technical solutions of the present application will be described clearly and completely with reference to specific embodiments and the accompanying drawings of the present application, to present the objectives, technical solutions, and advantages of the present application more clearly. It is apparent that the described embodiments are only a part of the embodiments of the present application, rather than all of the embodiments, and are not intended to limit the scope of the present invention. According to the embodiments of the present application, all of the other embodiments obtained by a person of ordinary skill in the art without any creative work shall fall within the protection scope of the present application.

In order to promote the development of large-displacement vibration testing technologies, the present application provides a decoupling mechanism for large-displacement vibration tests, including a first transfer decoupling assembly 1, a rotary amplifying assembly 3 and a second transfer decoupling assembly 2. The first transfer decoupling assembly 1 includes a first transfer shaft 11 and a first transfer main body 12, and the first transfer main body 12 is axially connected to the first transfer shaft 11 and rotates around the first transfer shaft 11. The second transfer decoupling assembly 2 includes a second transfer shaft 21 and a second transfer main body 22, and the second transfer main body 22 is axially connected to the second transfer shaft 21 and rotates around the second transfer shaft 21. The extension direction of the axis of the first transfer shaft is the same as that of the axis of the second transfer shaft. The rotary amplifying assembly 3 is connected to the first transfer shaft 11 by means of the first transfer main body 12. A first connecting shaft 15 is arranged between the rotary amplifying assembly 3 and the first transfer main body 12. The rotary amplifying assembly 3 is connected to the second transfer decoupling assembly 2 by means of the second transfer main body 22. A second connecting shaft 25 is arranged between the rotary amplifying assembly 3 and the second transfer main body 22. The extension directions of the axis of the first connecting shaft and the axis of the second connecting shaft are the same and are perpendicular to that of the axis of the first transfer shaft or the second transfer shaft. The first transfer decoupling assembly 1 is arranged on one side of a vibration exciter 02, and the second transfer decoupling assembly 2 is arranged on one side of a sliding table assembly 03.

When in use, the first transfer decoupling assembly 1 is fixedly connected to the vibration exciter 02, and the second transfer decoupling assembly 2 is fixedly connected to the sliding table assembly 03. In practice, the sliding table assembly 03 vibrates under the action of the vibration exciter 02. Through the transfer of force, an exciting force generated by the vibration exciter 02 is transferred to the first transfer shaft 11 of the first transfer decoupling assembly 1, and a radial force generated by the first transfer shaft 11 is transferred to the first connecting shaft 15 by means of the first transfer main body 12. The first connecting shaft 15 receives the exciting force, converts the received exciting force into a radial force of the first connecting shaft 15, and transfers the radial force to the rotary amplifying assembly 3. The second connecting shaft 25 receives an exciting force amplified by the rotary amplifying assembly 3 and converts the amplified exciting force into a radial force of the second connecting shaft 25. The radial force of the second connecting shaft 25 is transferred to the second transfer shaft 21 of the second transfer decoupling assembly 2 by means of the second transfer main body 22. The second transfer shaft 21 receives the force and converts the force into a radial force of the second transfer shaft 21, and the sliding table assembly 03 moves after receiving the radial force of the second transfer shaft 21, thus realizing large-displacement vibration of the sliding table assembly 03.

Compared with the prior art, the rotary amplifying assembly 3 provided by this embodiment includes a support 31 and a transfer rod 32. The top of the support 31 is axially connected to the transfer rod 32 by means of a third connecting shaft 33. The extension direction of the axis of the third connecting shaft is the same as that of the axis of the first connecting shaft or the second connecting shaft. A first end of the transfer rod is axially connected to the first transfer main body 12 by means of the first connecting shaft 15, and a second end of the transfer rod is axially connected to the second transfer main body 22 by means of the second connecting shaft 25. Preferably, the horizontal straight-line distance between the axis of the third connecting shaft and the axis of the first connecting shaft is L1, and the horizontal straight-line distance between the axis of the third connecting shaft and the axis of the second connecting shaft is L2, where L1<L2. In the structural design of this solution, it is ensured that the transfer rod 32 of the rotary amplifying assembly 3 is perpendicular to the direction of vibration.

In the present application, further, the first transfer main body 12 is provided with a first through hole for running through the first transfer shaft 11, and the first transfer main body 12 is axially connected to the first transfer shaft 11 through the first through hole. A rolling bearing or a radial sliding bearing, preferably a linear bearing, is arranged between the first through hole and the first transfer shaft 11. A carrying ball of the linear bearing is in point contact with a bearing bush, and a steel ball rolls with minimum frictional resistance, so that the linear bearing has small and stable friction, which does not change with the speed of the bearing. Therefore, smooth linear motion with high sensitivity and high precision can be achieved. Further preferably, bearing end caps, preferably linear bearing end caps, are arranged at two ends of the first through hole to protect the linear bearing.

Preferably, the first transfer decoupling assembly 1 further includes a first fixing block 13 and a second fixing block 14, and the first fixing block 13 and the second fixing block 14 are axially connected to the first transfer shaft 11 and located on two sides of the first transfer main body 12 respectively. The first fixing block 13 and the second fixing block 14 are of independent structures, and serve to fix the first transfer decoupling assembly 1 to the vibration exciter 02 to avoid direct contact between the first transfer main body 12 and the vibration exciter 02, and between the first transfer shaft 11 and the vibration exciter 02, thereby avoiding intense collision between the first transfer main body 12 and the vibration exciter 02, and between the first transfer shaft 11 and the vibration exciter 02, which prolongs the service life of the first transfer decoupling assembly 1. Further, the first fixing block 13 and the second fixing block 14 are also provided with connecting holes for fixing the first transfer decoupling assembly 1 to the vibration exciter.

More preferably, the first fixing block 13 is provided with a first shaft hole, and the first end of the first transfer shaft is axially connected to the first fixing block 13 through the first shaft hole. A rolling bearing or a radial sliding bearing, preferably a linear bearing, is arranged between the first end of the first transfer shaft and the first shaft hole. Bearing end caps, preferably linear bearing end caps, are further arranged at two ends of the first shaft hole. The second fixing block 14 is provided with a second shaft hole, and the second end of the first transfer shaft is connected to the second fixing block 14 through the second shaft hole. A rolling bearing or a radial sliding bearing, preferably a linear bearing, is arranged between the second end of the first transfer shaft and the second shaft hole. Bearing end caps, preferably linear bearing end caps, are further arranged at two ends of the second shaft hole. The bearing connection further avoids intense collision between the first transfer main body 12 and the vibration exciter 02, and between the first transfer shaft 11 and the vibration exciter 02, so that the service life of the first transfer decoupling assembly 1 is prolonged.

In the present application, further, the second transfer main body 22 is provided with a second through hole for running through the second transfer shaft 21, and the second transfer main body 22 is axially connected to the second transfer shaft 21 through the second through hole. A rolling bearing or a radial sliding bearing, preferably a linear bearing, is arranged between the second through hole and the second transfer shaft 21. A carrying ball of the linear bearing is in point contact with a bearing bush, and a steel ball rolls with minimum frictional resistance, so that the linear bearing has small and stable friction, which does not change with the speed of the bearing. Therefore, smooth linear motion with high sensitivity and high precision can be achieved. Further preferably, bearing end caps, preferably linear bearing end caps, are arranged at two ends of the second through hole to protect the linear bearing.

Preferably, the second transfer decoupling assembly 2 further includes a third fixing block 23 and a fourth fixing block 24, and the third fixing block 23 and the fourth fixing block 24 are axially connected to the second transfer shaft 21 and located on two sides of the second transfer main body 22 respectively. The third fixing block 23 and the fourth fixing block 24 are of independent structures, and serve to fix the second transfer decoupling assembly 2 to the sliding table assembly 03 to avoid direct contact between the second transfer main body 22 and the sliding table assembly 03, and between the second transfer shaft 21 and the sliding table assembly 03, thereby avoiding intense collision between the second transfer main body 22 and the sliding table assembly 03, and between the second transfer shaft 21 and the sliding table assembly 02, which prolongs the service life of the second transfer decoupling assembly 2. Further, the third fixing block 23 and the fourth fixing block 24 are also provided with connecting holes for fixing the second transfer decoupling assembly 2 to the vibration exciter.

More preferably, the third fixing block 23 is provided with a third shaft hole, and the first end of the second transfer shaft is axially connected to the third fixing block 23 through the third shaft hole. A rolling bearing or a radial sliding bearing, preferably a linear bearing, is arranged between the first end of the second transfer shaft and the third shaft hole. Bearing end caps, preferably linear bearing end caps, are further arranged at two ends of the third shaft hole. The fourth fixing block 24 is provided with a fourth shaft hole, and the second end of the second transfer shaft is connected to the fourth fixing block 24 through the fourth shaft hole. A rolling bearing or a radial sliding bearing, preferably a linear bearing, is arranged between the second end of the second transfer shaft and the fourth shaft hole. Bearing end caps, preferably linear bearing end caps, are further arranged at two ends of the fourth shaft hole. The bearing connection further avoids intense collision between the second transfer main body 22 and the sliding table assembly 03, and between the second transfer shaft 21 and the sliding table assembly 03, so that the service life of the second transfer decoupling assembly 2 is prolonged.

The present application also provides a vibration testing apparatus for large-displacement vibration tests, including a vibration exciter 02, a sliding table assembly 03 and the decoupling mechanism provided as above Preferably, the vibration exciter 02 is provided with a first adapter block 4, and the sliding table assembly 03 is provided with a second adapter block 5. The first adapter block 4 is equivalent to a buffer plate arranged between the vibration exciter 02 and the first transfer decoupling assembly 1, which strengthens the connection between the first transfer decoupling assembly 1 and the vibration exciter 02, and also buffers the transfer of force between the vibration exciter 02 and the first transfer decoupling assembly 1, thus prolonging the service life of the vibration exciter 02 and the first transfer decoupling assembly 1; and the second adapter block 5 is equivalent to a buffer plate arranged between the sliding table assembly 03 and the second transfer decoupling assembly 2, which strengthens the connection between the second transfer decoupling assembly 2 and the sliding table assembly 03, and also buffers the transfer of force between the sliding table assembly 03 and the second transfer decoupling assembly 2, thus prolonging the service life of the sliding table assembly 03 and the second transfer decoupling assembly 2.

In order to further understand the decoupling mechanism for large-displacement vibration tests, the present application also provides a set of embodiments for reference.

Embodiment 1

Figure 2:
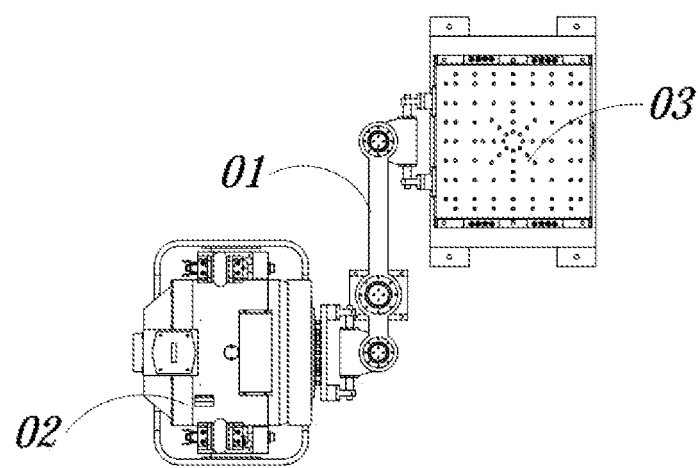
FIG. 2 is a schematic top view of the testing apparatus for large-displacement vibration tests.

This embodiment provides a decoupling mechanism for large-displacement vibration tests, including a first transfer decoupling assembly 1, a rotary amplifying assembly 3 and a second transfer decoupling assembly 2, as shown in FIG. 1 and FIG. 2.

Figure 7:
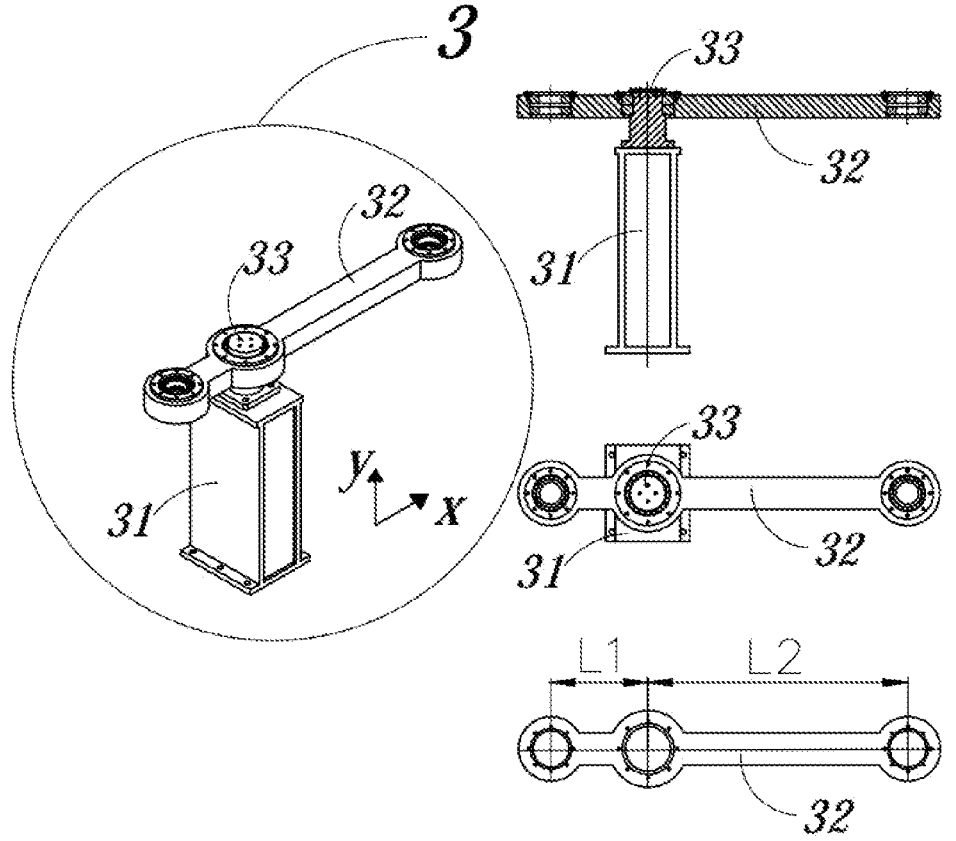
FIG. 7 is a schematic axial, front and top view of a rotary amplifying assembly and a schematic top view of a transfer bar.

As shown in FIG. 7, the rotary amplifying assembly 3 includes a support 31 and a transfer rod 32. A third connecting shaft 33 is arranged at the top of the support 31. The direction of the axis of the third connecting shaft 33 extends along the axis y. The transfer rod 32 is provided with a third annular hole running through the third connecting shaft 33. The transfer rod 32 is axially connected to the third connecting shaft 33 through the third annular hole. A first end of the transfer rod 32 is provided with a first annular hole, and a second end of the transfer rod 32 is provided with a second annular hole. Preferably, the horizontal straight-line distance between the axis of the third connecting shaft 33 and the axis of the first connecting shaft 15 is L1, and the horizontal straight-line distance between the axis of the third connecting shaft 33 and the axis of the second connecting shaft 25 is L2, where L1<L2. Further preferably, the third connecting shaft 33 is arranged at the top of the support 31 and integrally-molded with the support 31. More preferably, a third boss is arranged at an end portion of the third connecting shaft 33 in contact with the support 31, and the third boss increases the area of contact between the third connecting shaft 33 and the transfer rod 32, so that the support 31 can better support the transfer rod 32.

Figure 3:
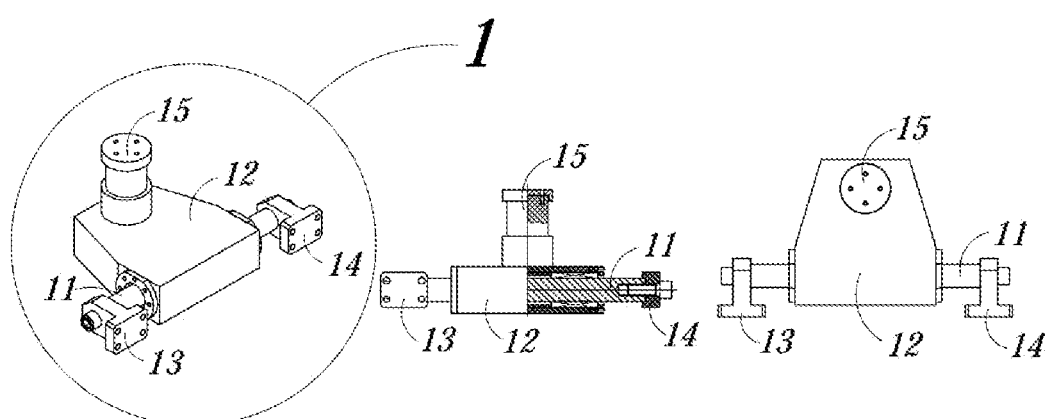
FIG. 3 is a schematic axial, front and top view of a first transfer decoupling assembly.
Figure 4:
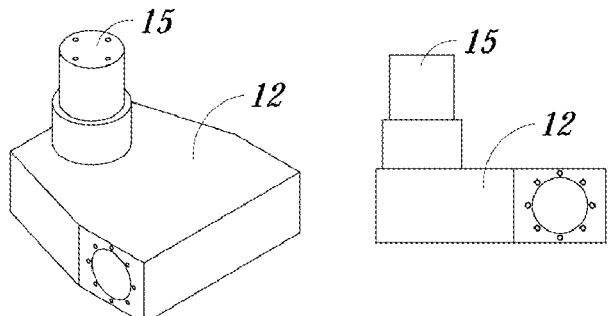
FIG. 4 is a schematic axial and left-side diagram of a first transfer main body.

As shown in FIG. 3 and FIG. 4, the first transfer decoupling assembly 1 includes a first transfer main body 12, a first transfer shaft 11, a first fixing block 13 and a second fixing block 14. The direction of the axis of the first transfer shaft 11 extends along the axis x. The first transfer main body 12 is provided with a first through hole running through the first transfer shaft 11, and the first transfer main body 12 is axially connected to the first transfer shaft 11 through the first through hole. The first fixing block 13 is provided with a first shaft hole, and a first end of the first transfer shaft 11 is axially connected to the first fixing block 13 through the first shaft hole. The second fixing block 14 is provided with a second shaft hole, and a second end of the first transfer shaft 11 is axially connected to the second fixing block 14 through the second shaft hole. The first transfer main body 12 is provided with a first connecting shaft 15 that matches the first annular hole. Preferably, the first connecting shaft 15 is located above the first transfer main body 12, and the first transfer main body 12 can support and protect the transfer rod 32 while transferring an exciting force. More preferably, as shown in FIG. 4, a first boss is arranged at an end portion of the first connecting shaft 15 in contact with the first transfer main body 12 and increases the area of contact between the transfer shaft and the first connecting shaft 15, which is beneficial to supporting the transfer shaft.

Figure 5:
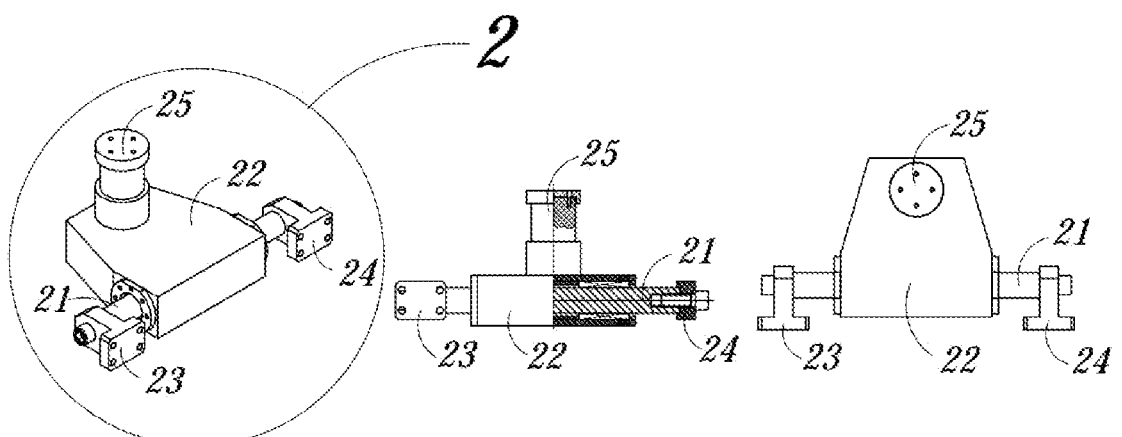
FIG. 5 is a schematic axial, front and top view of a second transfer decoupling assembly.
Figure 6:
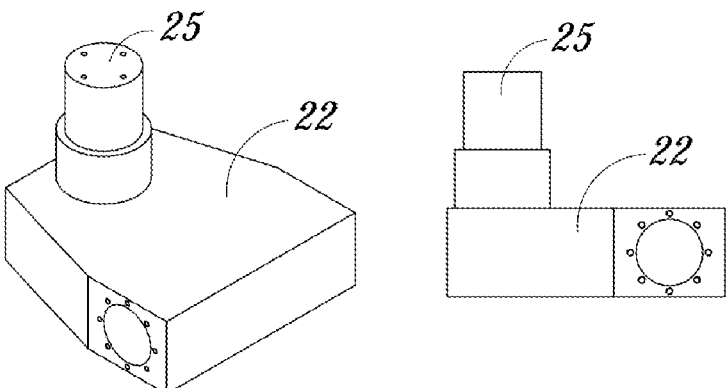
FIG. 6 is a schematic axial and left-side diagram of a second transfer main body.

As shown in FIG. 5 and FIG. 6, the second transfer decoupling assembly 2 includes a second transfer main body 22, a second transfer shaft 21, a third fixing block 23 and a fourth fixing block 24. The direction of the axis of the second transfer shaft 21 extends along the axis x. The second transfer main body 22 is provided with a second through hole running through the second transfer shaft 21, and the second transfer main body 22 is axially connected to the second transfer shaft 21 through the second through hole. The third fixing block 23 and the fourth fixing block 24 are axially connected to the second transfer shaft 21 and located on two sides of the second transfer main body 22 respectively. The second transfer main body 22 is axially connected to the second end of the transfer rod 32. The third fixing block 23 is provided with a third shaft hole, and a first end of the second transfer shaft 21 is axially connected to the third fixing block 23 through the third shaft hole. The fourth fixing block 24 is provided with a fourth shaft hole, and a second end of the second transfer shaft 21 is axially connected to the fourth fixing block 24 through the fourth shaft hole. The second transfer main body 22 is provided with a second connecting shaft 25 that matches the second annular hole. Preferably, the second connecting shaft 25 is located above the second transfer main body 22. The second transfer main body 22 can support and protect the transfer rod 32 while transferring an exciting force. More preferably, as shown in FIG. 6, a second boss is arranged at an end portion of the second connecting shaft 25 in contact with the second transfer main body 22 and increases the area of contact between the transfer shaft and the second connecting shaft 25, which is beneficial to supporting the transfer shaft.

In addition, it should be understood by those skilled in the art that within the scope of protection of the present application, when the first transfer main body 12 is axially connected to the first end of the transfer rod 32 by means of the first connecting shaft 15, it may be provided that the first connecting shaft 15 is arranged at the first end of the transfer rod 32, the first transfer main body 12 is provided with a first accommodating cavity for accommodating the first connecting shaft 15, and preferably, the first connecting shaft 15 is integrally-molded with the first end of the transfer rod 32.

In addition, it should be understood by those skilled in the art that within the scope of protection of the present application, when the second transfer main body 22 is connected to the second end of the transfer rod 32 by means of the second connecting shaft 25, it may be provided that the second connecting shaft 25 is arranged at the second end of the transfer rod 32, the second transfer main body 22 is provided with a second accommodating cavity for accommodating the second connecting shaft 25, and preferably, the second connecting shaft 25 is integrally-molded with the second end of the transfer rod 32.

In addition, it should be understood by those skilled in the art that within the scope of protection of the present application, when the top of the support 31 is axially connected to the transfer rod 32 by means of the third connecting shaft 33, it may be provided that the third connecting shaft 33 is arranged on the transfer rod 32, the top of the support 31 is provided with a third accommodating cavity for accommodating the third connecting shaft 33, and preferably, the third connecting shaft 33 is integrally-molded with the transfer rod 32.

Embodiment 2

Figure 8:
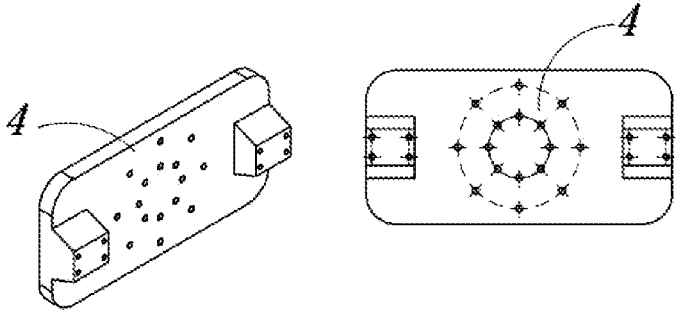
FIG. 8 is a schematic axial and front view of a first adapter block.
Figure 9:
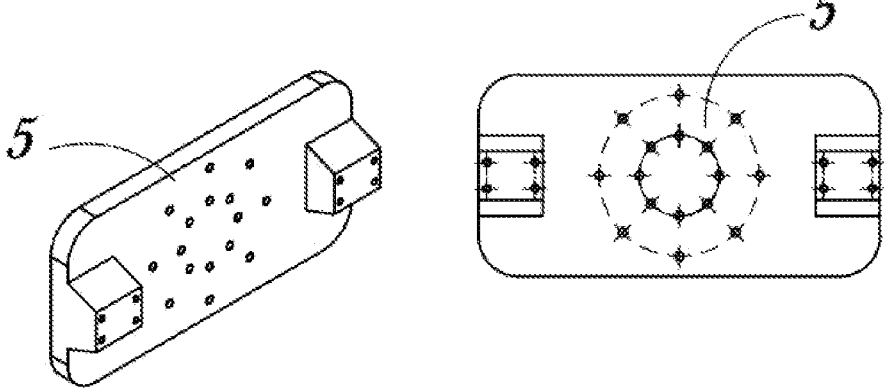
FIG. 9 is a schematic axial and front view of a second adapter block.

This embodiment provides a vibration testing apparatus for large-displacement vibration tests, which includes a vibration exciter 02, a sliding table assembly 03 and the decoupling mechanism provided in Embodiment 1, with reference to FIG. 1 and FIG. 2. Preferably, the vibration exciter 02 is provided with a first adapter block 4. As shown in FIG. 8, the first adapter block 4 is provided with a plurality of screw holes for fixing the first adapter block 4 to the vibration exciter 02. The first adapter block 4 is also provided with a first boss for fixing a first fixing block 13 and a second boss for fixing a second fixing block 14, and the first boss and the second boss are also provided with a plurality of screw holes respectively. The sliding table assembly 03 is provided with a second adapter block 5. As shown in FIG. 9, the second adapter block 5 is provided with a plurality of screw holes for fixing the second adapter block 5 to the sliding table assembly 03. The second adapter block 5 is also provided with a third boss for fixing a third fixing block 23 and a fourth boss for fixing a fourth fixing block 24, and the third boss and the fourth boss are also provided with a plurality of screw holes respectively.

In summary, the present application provides the decoupling mechanism for large-displacement vibration tests, including the first transfer decoupling assembly 1, the rotary amplifying assembly 3 and the second transfer decoupling assembly 2. When in use, the first transfer decoupling assembly 1 is fixedly connected to the vibration exciter 02, and the second transfer decoupling assembly 2 is fixedly connected to the sliding table assembly 03. Through the transfer of force, after the first transfer decoupling assembly 1 receives an acting force from the vibration exciter 01, the acting force is amplified by the rotary amplifying assembly, the amplified acting force is transferred to the second transfer decoupling assembly 2, and the sliding table assembly 03 receives the acting force from the second transfer decoupling assembly 2, thus finally realizing large-displacement vibration of the sliding table assembly 03.

Although the description is described according to the embodiments, it is not intended that each embodiment includes only one independent technical solution, such a description manner is only for the sake of clarity, and those skilled in the art should take the description as an integral part. The technical solutions in the embodiments may be suitably combined to form other embodiments understandable by those skilled in the art.

The detailed descriptions set forth above are merely specific illustrations of feasible embodiments of the present invention, and are not intended to limit the scope of protection of the present invention. All equivalent embodiments or modifications that do not depart from the gist and spirit of the present invention should fall within the scope of protection of the present invention.

What is claimed is:

1. A decoupling mechanism for large-displacement vibration tests, comprising a first transfer decoupling assembly, a rotary amplifying assembly and a second transfer decoupling assembly, wherein the first transfer decoupling assembly comprises a first transfer shaft and a first transfer main body, and the first transfer main body is axially connected to the first transfer shaft; the second transfer decoupling assembly comprises a second transfer shaft and a second transfer main body, and the second transfer main body is axially connected to the second transfer shaft; an extension direction of an axis of the first transfer shaft is the same as that of an axis of the second transfer shaft; the rotary amplifying assembly is connected to the first transfer shaft by means of the first transfer main body, and a first connecting shaft is arranged between the rotary amplifying assembly and the first transfer main body; the rotary amplifying assembly and the second transfer decoupling assembly are connected by means of the second transfer main body, and a second connecting shaft is arranged between the rotary amplifying assembly and the second transfer main body; and extension directions of an axis of the first connecting shaft and an axis of the second connecting shaft are the same and are perpendicular to that of the axis of the first transfer shaft or the second transfer shaft;

the first transfer decoupling assembly is arranged on one side of a vibration exciter, and the second transfer decoupling assembly is arranged on one side of a sliding table assembly; and when in use, the first transfer decoupling assembly is fixedly connected to the vibration exciter, and the second transfer decoupling assembly is fixedly connected to the sliding table assembly;

wherein the rotary amplifying assembly comprises a support and a transfer rod; the top of the support is axially connected to the transfer rod by means of a third connecting shaft; an extension direction of an axis of the third connecting shaft is the same as that of the axis of the first connecting shaft or the second connecting shaft; a first end of the transfer rod is axially connected to the first transfer main body by means of the first connecting shaft; and a second end of the transfer rod is connected to the second transfer main body by means of the second connecting shaft; a horizontal straight-line distance between the axis of the third connecting shaft and the axis of the first connecting shaft is L1, and a horizontal straight-line distance between the axis of the third connecting shaft and the axis of the second connecting shaft is L2, L1<L2; the third connecting shaft is arranged at the top of the support and integrally-molded with the support, and the transfer rod is provided with a third through hole running through the third connecting shaft.

2. The decoupling mechanism for large-displacement vibration tests according to claim 1, wherein a third boss is arranged at an end portion of the third connecting shaft in contact with the support.

3. The decoupling mechanism for large-displacement vibration tests according to claim 1, wherein the first transfer decoupling assembly further comprises a first fixing block and a second fixing block, and the first fixing block and the second fixing block are axially connected to the first transfer shaft and located on two sides of the first transfer main body respectively.

4. The decoupling mechanism for large-displacement vibration tests according to claim 3, wherein the first fixing block is provided with a first shaft hole, and a first end of the first transfer shaft is axially connected to the first fixing block through the first shaft hole; and the second fixing block is provided with a second shaft hole, and a second end of the first transfer shaft is axially connected to the second fixing block through the second shaft hole.

5. The decoupling mechanism for large-displacement vibration tests according to claim 1, wherein the second transfer decoupling assembly further comprises a third fixing block and a fourth fixing block, and the third fixing block and the fourth fixing block are axially connected to the second transfer shaft and located on two sides of the second transfer main body respectively.

6. The decoupling mechanism for large-displacement vibration tests according to claim 5, wherein the third fixing block is provided with a third shaft hole, and a first end of the second transfer shaft is axially connected to the third fixing block through the third shaft hole; and the fourth fixing block is provided with a fourth shaft hole, and a second end of the second transfer shaft is axially connected to the fourth fixing block through the fourth shaft hole.

7. A vibration testing apparatus for large-displacement vibration tests, comprising a vibration exciter, a sliding table assembly and a decoupling mechanism, wherein the decoupling mechanism comprising a first transfer decoupling assembly, a rotary amplifying assembly and a second transfer decoupling assembly, wherein the first transfer decoupling assembly comprises a first transfer shaft and a first transfer main body, and the first transfer main body is axially connected to the first transfer shaft; the second transfer decoupling assembly comprises a second transfer shaft and a second transfer main body, and the second transfer main body is axially connected to the second transfer shaft; an extension direction of an axis of the first transfer shaft is the same as that of an axis of the second transfer shaft; the rotary amplifying assembly is connected to the first transfer shaft by means of the first transfer main body, and a first connecting shaft is arranged between the rotary amplifying assembly and the first transfer main body; the rotary amplifying assembly and the second transfer decoupling assembly are connected by means of the second transfer main body, and a second connecting shaft is arranged between the rotary amplifying assembly and the second transfer main body; and extension directions of an axis of the first connecting shaft and an axis of the second connecting shaft are the same and are perpendicular to that of the axis of the first transfer shaft or the second transfer shaft;

the first transfer decoupling assembly is arranged on one side of a vibration exciter, and the second transfer decoupling assembly is arranged on one side of a sliding table assembly; and when in use, the first transfer decoupling assembly is fixedly connected to the vibration exciter, and the second transfer decoupling assembly is fixedly connected to the sliding table assembly;

wherein the rotary amplifying assembly comprises a support and a transfer rod; the top of the support is axially connected to the transfer rod by means of a third connecting shaft; an extension direction of an axis of the third connecting shaft is the same as that of the axis of the first connecting shaft or the second connecting shaft; a first end of the transfer rod is axially connected to the first transfer main body by means of the first connecting shaft; and a second end of the transfer rod is connected to the second transfer main body by means of the second connecting shaft; a horizontal straight-line distance between the axis of the third connecting shaft and the axis of the first connecting shaft is L1, and a horizontal straight-line distance between the axis of the third connecting shaft and the axis of the second connecting shaft is L2, L1<L2; the third connecting shaft is arranged at the top of the support and integrally-molded with the support, and the transfer rod is provided with a third through hole running through the third connecting shaft.

8. The vibration testing apparatus for large-displacement vibration tests according to claim 7, wherein the vibration exciter is provided with a first adapter block, and the sliding table assembly is provided with a second adapter block.

9. The vibration testing apparatus for large-displacement vibration tests according to claim 7, wherein a third boss is arranged at an end portion of the third connecting shaft in contact with the support.

10. The vibration testing apparatus for large-displacement vibration tests according to claim 7, wherein the first transfer decoupling assembly further comprises a first fixing block and a second fixing block, and the first fixing block and the second fixing block are axially connected to the first transfer shaft and located on two sides of the first transfer main body respectively.

11. The vibration testing apparatus for large-displacement vibration tests according to claim 10, wherein the first fixing block is provided with a first shaft hole, and a first end of the first transfer shaft is axially connected to the first fixing block through the first shaft hole; and the second fixing block is provided with a second shaft hole, and a second end of the first transfer shaft is axially connected to the second fixing block through the second shaft hole.

12. The vibration testing apparatus for large-displacement vibration tests according to claim 7, wherein the second transfer decoupling assembly further comprises a third fixing block and a fourth fixing block, and the third fixing block and the fourth fixing block are axially connected to the second transfer shaft and located on two sides of the second transfer main body respectively.

13. The vibration testing apparatus for large-displacement vibration tests according to claim 12, wherein the third fixing block is provided with a third shaft hole, and a first end of the second transfer shaft is axially connected to the third fixing block through the third shaft hole; and the fourth fixing block is provided with a fourth shaft hole, and a second end of the second transfer shaft is axially connected to the fourth fixing block through the fourth shaft hole.

* * * * *